United States Patent [19]

Hansson et al.

[11] Patent Number: 4,621,936
[45] Date of Patent: Nov. 11, 1986

[54] ZIRCONIA PEN BALLS

[75] Inventors: John N. Hansson, Chagrin Falls; Herbert L. Johns, Madison, both of Ohio

[73] Assignee: Corning Glass Works, Corning, N.Y.

[21] Appl. No.: 542,315

[22] Filed: Oct. 14, 1983

[51] Int. Cl.⁴ .......................... B43K 1/08; B43K 7/00; C04B 35/48
[52] U.S. Cl. .................................. 401/215; 501/103; 501/104; 501/105
[58] Field of Search ................. 401/215; 501/103-105

[56] References Cited

U.S. PATENT DOCUMENTS

| | | | |
|---|---|---|---|
| 2,699,148 | 1/1955 | Schweiger | 401/215 |
| 2,847,751 | 8/1958 | Reed | 401/215 |
| 2,984,628 | 5/1961 | Alexander et al. | 252/313.1 |
| 3,887,387 | 6/1975 | Sturhahn | 501/104 |
| 4,067,745 | 1/1978 | Garvie et al. | 501/104 |
| 4,182,627 | 1/1980 | Hardwick et al. | 401/215 X |
| 4,316,964 | 2/1982 | Lange | 501/105 |
| 4,360,598 | 11/1982 | Otagiri et al. | 501/103 |
| 4,430,279 | 2/1984 | Hagio et al. | 501/103 |
| 4,544,607 | 10/1985 | Kaneno et al. | 501/103 |
| 4,565,792 | 1/1986 | Knapp | 501/103 |

FOREIGN PATENT DOCUMENTS

| | | | |
|---|---|---|---|
| 0142239 | 5/1985 | European Pat. Off. | 401/215 |
| 2376759 | 9/1978 | France | 401/196 |
| 56-140063 | 11/1981 | Japan . | |
| 57-111278 | 7/1982 | Japan | 501/103 |
| 58-138698 | 8/1983 | Japan | 401/215 |

OTHER PUBLICATIONS

Stevens, R., "An Introduction to Zirconia", pub'd Jun. 1983, by Magnesium Elektron Ltd., United Kingdom, pp. 7-9.
Rieth, P. H. et al., "Fabrication and Flexural Strength of Ultrafine-Grained Yttria-Stabilized Zirconia'"—Ceramic Bull., 55, No. 8 (1976), pp. 717-721, 727.
Amato et al, Revue Internationale des Hautes Temperatures et des Refractaires, vol. 9, No. 2, Apr./Jun. 1972, pp. 197-204.

Primary Examiner—Helen M. McCarthy
Attorney, Agent, or Firm—R. N. Wardell; T. J. Greer

[57] ABSTRACT

A liquid transfer ball formed from sintered zirconium oxide particles which exhibits utility as the ball element of a ball pen writing instrument to transfer ink from an ink reservoir to a writing surface such as paper. The ball exhibits a porosity of less than 8% by volume and is immune to corrosive action of inks.

9 Claims, 4 Drawing Figures

ZIRCONIA PEN BALLS

This invention relates to a liquid transfer element and more particularly to a ball for transferring ink to a writing surface from an ink reservoir, the ball being mounted in a socket for multiaxial or free rotation, with the rear of the ball in communication with the ink reservoir as in the manner of the well known ball point pen.

Two basic types of ball point pens are currently produced. One type uses oil-based, high viscosity ink, and the other type uses water-based, low viscosity ink. The latter type is termed a rolling ball pen. The balls presently used in such pens are usually composed of either stainless steel or cemented tungsten carbide.

In spite of its simplicity in concept and operation, the ball type pen often displays one or more malfunctional modes. For example, the ink may not wet the ball, the ball friction against the writing surface may be so low that the ball will not rotate, the surface of the ball may be so rough as to result in intolerable socket wear, the wear resistance of the ball may be unacceptably low, the chemical reaction between the material of construction of the ball and the composition of the ink may result in corrosion of the ball and/or corrosion of the ball socket. Of these malfunctions, corrosion has been the most difficult to overcome.

The corrosion may be uniform in which the ball, usually metal, corrodes over the entire surface at a uniform rate. The corrosion may also be limited to a specific area of the surface and over which corrosion may occur at a relatively rapid rate. Localized corrosion is the most troublesome of these two types.

Of localized corrosion there are five generally recognized forms, these being due to stress/strain as stemming from cold working, heat treating or externally applied stress during use of the pen. Corrosion types are: pitting corrosion as may be due to the presence of lint or dust; crevice corrosion as may be due to metal—to—metal contact; galvanic corrosion as may be due to dissimilar metals in contact with an electrolyte; and intergranular corrosion. This occurs in unannealed austenitic stainless steel balls. The chrome in the stainless steel sometimes precipitates out in the grain boundaries as chromium carbide. Grain boundary carbides work to remove chromium from adjacent areas, making the latter areas more susceptible to attack in selected environments.

Corrosion may also be due to or affected: by the presence of impurities in the ball; ambient temperature increases which are usually accompanied by an increase in corroding activity; the degree of aeration vis-a-vis the ball which usually affects the rate of corrosion; and the velocity of the ball surface relative to the corrodent (ink, socket, etc.) will often affect the corrosion rate.

From the observations of the behaviour of prior ball elements as the liquid transfer element in a ball point pen, the reader will immediately recognize that corrosive problems of appreciable magnitude and number exist with respect to ball elements of this type fashioned from or containing metal, such as the metal and metal-containing types known in this art as 440C stainless steel, 440C superhard stainless, GE 44A tungsten carbide (tungsten carbide particles cemented together by cobalt), and GE 657 (tungsten carbide, cobalt and chromium), the latter two materials being marketed by General Electric Co.

It has been proposed in the art of ball point pens that other ball materials be employed, such as glass, ceramics, austenitic stainless steel and coated ceramics. Some tests have shown that coated ceramics display high resistance to wear and also exhibit good resistance to corrosion. Austenitic stainless steel is too soft, not possessing the requisite wear resistance of such a ball, even though the corrosion resistance of this material is high. Ceramics have appeared to be desirable materials for pen ball constructions, yet they have not, prior to this invention, displayed the required physical properties, one of which is a relatively low porosity.

Many ceramic materials also exhibit high abrasive qualities and were hence unsuitable.

Recently, in the U.S.A., a Japanese made ball point pen using a "CeraBall" designated ball has been marketed. A chemical analysis indicates that these balls are composed of silicon carbide.

SUMMARY OF THE INVENTION

According to the practice of this invention, a liquid transfer ball displaying utility as the ball of a ball point pen is formed of a zirconia (zirconium oxide) based ceramic at least partially stabilized. The zirconia based ceramic ball is formed from sintered zirconia particles, sintered here referring to a mass of particles bonded directly to each other without substantial melting and in any of known ways, e.g. shaped and/or pressed into a green body and then fired to sintering temperature. One method of forming the liquid transfer ball of this invention is by the hot isostatic pressing of prior art zirconia dispersion ball elements. Alternatively, the liquid transfer balls of this invention may be formed by employing the same prior art method of forming at least partially stabilized zirconia dispersion balls, except that the average particle size of the zirconia particles is substantially less. Each of these processes will yield the liquid transfer ball element of this invention so as to produce a ceramic ball capable of use as a pen ball for a ball point pen. The porosity of the finished ball is significantly decreased, relative to that of the prior art zirconia dispersion balls, i.e., from about 20% to less than 8%, by volume. This decrease in porosity enables the balls to be used, after polishing, as the liquid (ink) transfer medium of a ball point pen. Pens employing the balls of this invention are particularly useful in rolling-ball pens, i.e., pens using water bases, low viscosity inks, as opposed to the more traditional ball point pens which use oil-based, high viscosity inks. It will be understood, however, that the invention also exhibits the same general utilities and desirable end results in relatively high viscosity ink ball pens.

This difference in ball porosity is realized, in one mode of manufacture, by grinding the batch solids used in the slip to make the zirconia based ceramic by vibratory milling to an average particle size of about one-half (0.5) to one (1.0) micron. The surface roughness after polishing, as arithmetic mean value, is in the range 4 to 6 micro inches for rolling ball pens, and in the range 1.5 to 2.0 micro inches for viscous ink pens.

Zirconia pen ball lots with average porosities below about 2 percent, as determined by image analysis, can be finished to both 1.5 to 2 and 4 to 6 micro inch ranges, and are, therefore, suitable for both varieties of pen. Ball lots with porosities in the range of about 3 to 8 percent can be finished to 4 to 6 micro inches, and are suitable for rolling ball applications.

Balls with porosities greater than about 8 percent by volume finish to a roughness exceeding 6 micro inches. Pens made with such balls may have undesirable scratchiness during writing and may abrade the socket excessively. However, rough balls are excellent for writing on smooth or greasy surfaces, and in some specific applications this could be a desirable feature.

In addition to porosity, another important factor measured on pen balls is strength. The balls must survive the stresses applied during pen assembly and during use without failure. The zirconia pen balls of this invention possess a crushing strength in excess of 60 pounds and meet these requirements.

At the same roughness levels, the zirconia pen balls of this invention (for rolling ball pens) abrade the pen seats at a significantly lower rate than cemented tungsten carbide balls. Chemical or galvanic corrosion of these zirconia pen balls was not detected. Abrasive wear of zirconia balls during writing was insignificant.

Line quality was improved over that obtained with tungsten carbide balls, and the length of line obtained was longer. This appears to be related to the wettability characteristics of the zirconia-ink system. The ball of this invention writes on all greasy surfaces with water based inks. Further, the balls wrote at rates exceeding one meter per second, without skipping, faster than any other pen ball material tested. The uniformity of finished balls obtained from a lot of zirconia blanks was superior to that of a lot of tungsten carbide blanks, and the finishing of comparably sized blanks was less expensive.

In summary, certain inherent characteristics of zirconia ceramics appear to contribute to their superior performance in pen balls, these are lubricity, wettability by inks, wear resistance, and corrosion resistance. The principal ceramic properties of zirconia balls of this invention that have been identified as being essential to their use in pens are (1) low porosity and (2) adequate strengeh. For use in rolling ball pens, zirconia balls are preferably finished to a roughness of about 4 to 6 micro inches, which requires balls with porosities in the range zero to about 8 percent. For use in viscous ink pens the corresponding values are 1.5 to 2 micro inches and zero to about 2 percent, respectively. The crushing strength of 1.5 mm ball blanks (unpolished) compressed between cemented tungsten carbide anvils, at a crosshead speed of about 0.2 mm per minute, exceeds 60 pounds.

DETAILED DESCRIPTION

The prior art is already aware of a process for making zirconia balls for use, for example, in high speed dispersion mills for dispersion of paint and ink pigments.

PRIOR ART BALL-MAKING PROCESS

Figure 1:
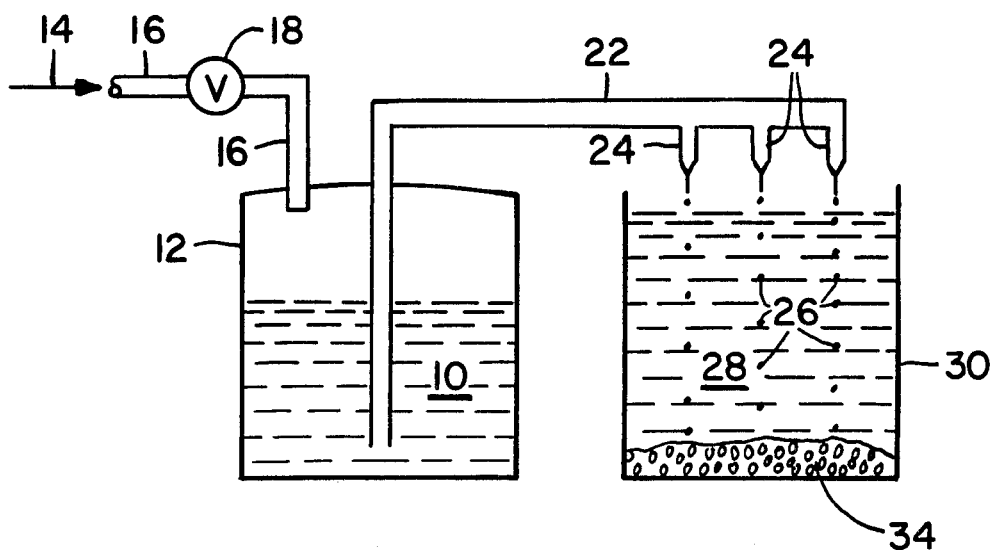
FIG. 1 is a partially schematic view of an apparatus for forming dispersion media/abrading balls of the prior art, known as the sol-gel process, the apparatus also being employed in the manufacture of the pen balls of this invention.

A process termed the sol-gel process for manufacturing zirconia-based, paint pigment dispersion media (Zircoa 1304 Zirbead, a trademark of Corning Glass Works) has been practiced for about 20 years by a division of Corning Glass Works, the assignee of this invention. These balls are used, for example, as dispersion media in the manufacture of paints and also for abrading purposes. This process is illustrated in FIG. 1 (later to be described). The product, consisting of balls with diameters in the range 0.5 to 3.4 mm, is almost completely impervious and it normally contains about 20 volume percent porosity by volume as measured by image analysis of a polished section. Because of this high porosity the balls could not be polished to a smooth enough surface to be used as pen balls because the polishing substantially removed the impervious surface layer thereby exposing the hish porosity of the internal portions of the balls.

This prior art sol-gel process is based on the well-known reaction of soluble alginates (ammonium or sodium alginate) with water solution of certain multivalent metallic salts, such as alkaline earth halides ($CaCl_2$), to form gels. The following equation illustrates this reaction:

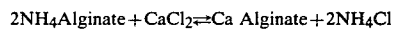

$$2NH_4Alginate + CaCl_2 \rightleftharpoons Ca\ Alginate + 2NH_4Cl$$

Ammonium alginate, a derivative of seaweed, is commercially available from Kelco Division of Merck & Co., Inc. under the tradename Superloid.

CERAMIC COMPOSITION

The prior art paint dispersion media and new pen balls of this invention can have essentially identical chemical compositions, namely, 96.5 weight % $ZrO_2$ and 3.5 weight % MgO (90-10 on a mole basis). In addition, the abrading balls contain minor amounts of oxides such as $HfO_2$, $SiO_2$, and CaO which are introduced largely with the zirconia powders used in formulating the batches. The 3.5% level of MgO was selected because it was found to produce balls with maximum crushing strength when fired in a tunnel kiln at a maximum temperature of 1675 degrees C.

MgO is present in the composition in order to stabilize the zirconia in the cubic form and avoid the disruption caused by the otherwise occuring tetragonal to monoclinic crystalline form inversion during cooling from the firing temperature. It is well known in the art that CaO, $Y_2O_3$, $CeO_2$, and other materials, alone and in combination, also are effective in stabilizing zirconia. It is highly likely that these and other stabilizers would also produce zirconia ceramic suitable for use as pen balls. A discussion of compositional possibilities is included in U.S. Pat. No. RE. 28,792 and U.S. Pat. No. 4,035,191.

SLIP COMPOSITION AND PROCESSING

Slip compositions used to produce the prior art dispersion media/abrading balls and those used to produce pen balls of this invention are as follows:

TABLE I

| | Wt. Percent | |
|---|---|---|
| Ingredient | Prior Art Dispersion Media Abrading Balls | New Pen Balls |
| Zircoa A-Grain[1] | 47.52 | 49.84 |
| AMA Grain S992[2] | 21.59 | — |
| Mg(OH)$_2$ | 3.52 | 2.59 |
| Water | 26.06 | 46.49 |
| Superloid | 0.22 | 0.39 |
| Darvan 7 | 1.09 | — |
| Nopcosperse 44 | — | 0.69 |

[1] monoclinic zirconium oxide, a product of Corning Glass Works
[2] monoclinic zirconium oxide, a product of Associated Minerals Consolidated, Ltd. of Bow, New Hampshire Superloid (ammonium alginate), Darvan 7, and Nopcosperse 44 (the latter two compositions being anionic polyelectrolytes consisting of sodium polyacrylate in aqueous solution) are products of Kelco, R. T. Vanderbilt Co., and Diamond Shamrock Corp., respectively. The amounts of water and the deflocculants Darvan 7 and Nopcosperse 44 may vary from these levels in order to adjust the density and viscosity of the slips.

The batch for producing the dispersion media for forming abrading balls is ball milled for 16 hours, producing a slip (slurry) with an average particle size of about 2 microns. Typical particle size distributions for both the prior art abrading ball slips and the slips of this invention (the latter under the heading Pen Balls) are listed in Table 2. The pen ball batches for the present invention are ground in a vibratory mill to an average particle size in the range of one to about 0.5 microns; this requires milling times of about 48 to 72 hours. The two given distributions for the new pen ball batches roughly define the limits of distributions which actually were used in producing pen balls. When the average batch particle size exceeds a value of about 1 micron, the resulting balls are excessively porous and unsuitable for pen balls unless further processed as in Example 1 below.

TABLE 2

Batch particle size distributions of slips for producing both prior art zirconia dispersion media abrading balls and the pen balls of this invention

| | % Finer Than | | |
|---|---|---|---|
| Particle Dia. (microns) | Prior Art Abrading Balls | New Pen Balls | |
| 10.55 | 100.0 | 100.0 | 100.0 |
| 7.46 | 97.8 | 100.0 | 100.0 |
| 5.27 | 92.0 | 100.0 | 100.0 |
| 3.73 | 79.8 | 100.0 | 100.0 |
| 2.63 | 61.7 | 98.6 | 100.0 |
| 1.69 | 41.3 | 83.7 | 100.0 |
| 1.01 | 22.5 | 57.7 | 87.7 |
| 0.66 | 11.5 | 35.8 | 62.8 |
| 0.43 | 4.0 | 18.1 | 37.1 |
| 0.34 | 0.8 | 8.3 | 18.8 |
| 0.24 | 0.3 | 4.6 | 10.0 |
| 0.17 | 0.0 | 1.8 | 3.8 |
| Avg. | 2.09 | 0.89 | 0.54 |

Figure 2:
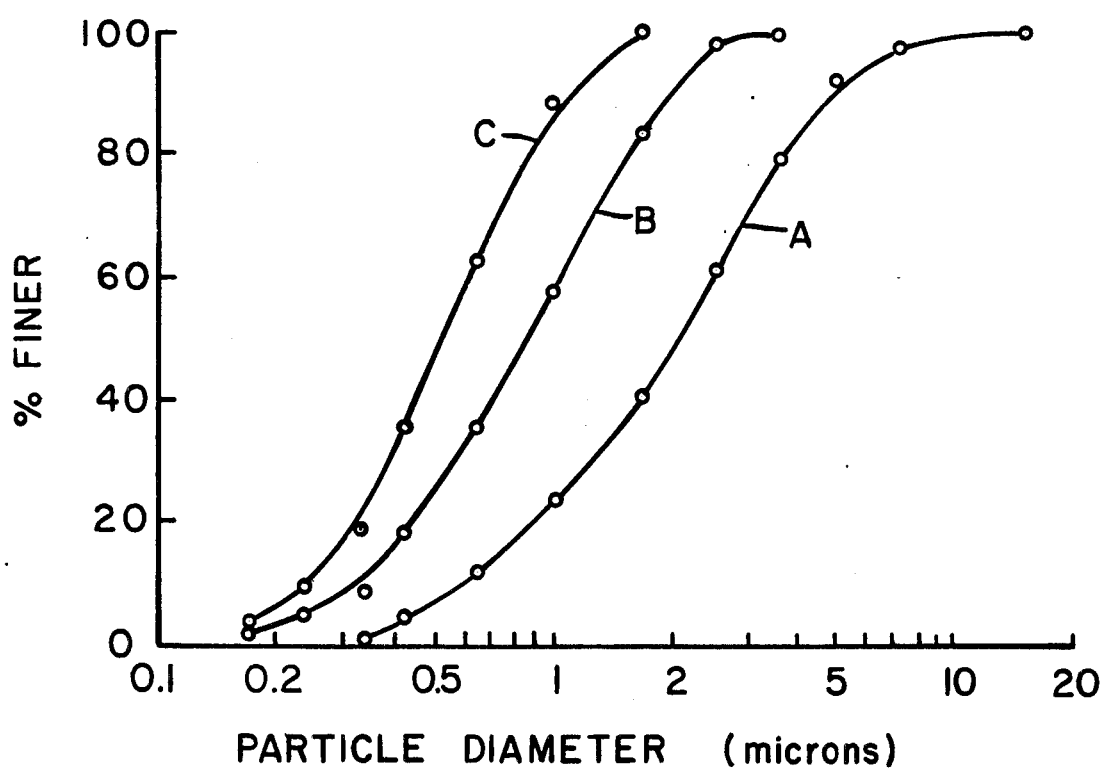
FIG. 2 is a graph which illustrates the particle size distribution of a zirconium oxide containing batch set out at Table 2, the graph showing the slip particle size distribution, (as curve A) for the prior art dispersion media/abrading balls, and (as curves B and C) particle size distributions which may be used to make the pen balls of this invention, according to one embodiment.
Figure 3:
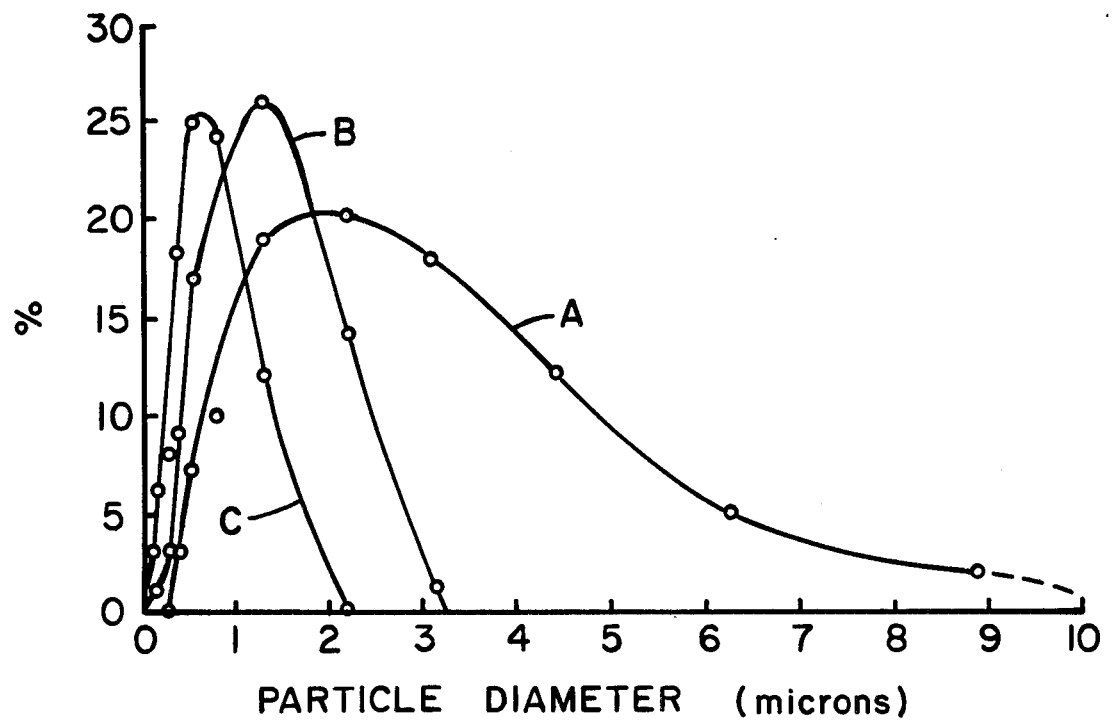
FIG. 3 is a graph, corresponding to FIG. 2, which sets out the same particle size distributions of Table 2, but which employs percent as the ordinate (instead of percent finer than) and which does not employ a logarithmic scale on the abscissa.

Curve A of both FIGS. 2 and 3 illustrates a typical particle size distribution for the slips used to produce prior art dispersion media/abrading balls formed by the sol-gel process.

BALL FORMATION

FIG. 1 is a schematic drawing of the prior art ball-forming process, this process also being employed (with smaller average diameter particle size) in the present invention. The slip or slurry 10 is placed in a closed container 12 which can be pressurized with air, as indicated by high pressure air 14 being fed into piping 16 through valve 18. This pressure causes the slip 10 to flow to a manifold duct 22 carrying a multiplicity of nozzles 24 for forming drops. Nozzles of stainless steel or plastic tubing can be used, the larger the opening of the nozzle the larger the drop diameter. It has been found that the drop size is also affected by dropping rate, and a rate of 2 to 3 drops per second is typical.

When drops 26 from nozzles 24 enter the CaCl$_2$ solution 28 in container 30, the exchange reaction with the ammonium alginate occurs, causing the slip to gel. A solution 28 depth of about 16 inches is sufficient to produce gelled balls that are not damaged by impact with the container bottom and with other balls.

The gelled balls 34 are recovered from the solution, washed with water to remove CaCl$_2$ residue, and placed in a drier at about 100 degrees C. to remove the water.

FIRING

The now dried balls 34 are next placed in stabilized zirconia crucibles and fired in a tunnel kiln on the following schedule:
Room Temperature–870° C. @ 170° C./hr
870° C.–1675° C. @ 135° C./hr
Hold 1675° C. for 4 hours
1675° C.–1340° C. @ 250° C./hr
1340° C.–870° C. @ 95° C./hr
870° C.–R.T. @ 115° C./hr This firing schecule produces balls composed almost wholly of cubic zirconia with minor amounts of tetragonal and monoclinic precipitates. The cooling schedule can be modified to have a hold in the range below 1340 degrees in order to produce a greater quantity of precipitation if an increase in ball toughness is desired.

Fired dispersion media abrading balls of the prior art normally have porosities of about 20 volume percent, as measured by optical image analysis of a polished section. Optical image analysis was carried out using an image analysis computer system consisting of a Leitz texture analyzing system, TAS brand, Model No. 1980 coupled to a programmable data processor, model PDP 11/34 marketed by Digital Equipment Corp. The techniques of optical image analysis are known, and are described for example in *Mathematical Morphology and Image Analysis* by J. Serra, Academic Press, N.Y. 1982.

Balls suitable for pen balls, according to the present invention, must have porosities below about 8 percent. Such balls can be produced by processing prior art abrading balls to reduce the porosity thereof as shown by the following example.

EXAMPLE 1

The porosity of the prior art fired balls can be reduced, according to this invention to levels below 8 percent by volume and even below 0.5 percent, by hot isostatic pressing. This technique is known, and is described for example in U.S. Pat. No. 3,562,371. Since the prior art fired balls are substantially impervious to gas, the combined high temperature and pressure of hot isostatic pressing can be effective in producing almost fully dense balls. The following hot isostatic pressing schedule is effective to operate on the prior art dispersion media/abrading balls to produce pen balls of this invention.

R.T.-1600° C. @ 27° C./min
Hold 1600° C. for 2 hours
1600° C.-1200° C. @ 27° C./min
Hold 1200° C. for 45 minutes
1200° C.-R.T. @ 13° C./min The argon pressure at 1600° C. is 30,000 psi. Balls that have been presintered at temperatures appreciably lower than the 1675 degrees normally used, say at 1550 degrees, can be hot isostatically pressed to full density. Low temperature sintering produces balls with the porosity almost entirely located at the grain boundaries, rather than within the grains. Hot isostatic pressing is highly effective in removing grain boundary porosity, and is less effective with pores within the grains.

The liquid transfer balls which are formed by hot isostatically pressing yielded ceramic balls wherein zirconium oxide is the major analytical constituent of the ceramic. The balls exhibited porosity as determined by optical image analysis of a polished section. These liquid transfer balls were at least partially stabilized by a stabilizer which produced at least one phase selected from cubic and tetragonal zirconia at elevated temperatures and which phase tends to be retained upon cooling to room temperature. These balls are produced by first forming a sintered mass of at least partially stabilized zirconium oxide, the sintered mass exhibiting porosity, as determined by optical image analysis of a polished section, the balls then being hot isostatically pressed to reduce the porosity. The centered mass may be formed of particles whose average particle size is greater than one micron and exhibits a porosity of at least about 10% prior to the hot isostatic pressing step.

Excessively out-of-round pen balls can be sorted out using a vibrating table as described in ASTM D1155-53.

ALTERNATE BALL-MAKING PROCESSES

Numerous processes for forming spheres from finely-divided powders are described in the literature, and other possibilities can be imagined. The latter include (1) extrusion of a rod of circular cross-section that is cut into short sections, either before or after firing, and (2) dry pressing a powder to form right cylinders; in both cases extensive grinding of the fired cylinder, involving removal of at least 40% of the stock, is required to arrive at the required spherical shape.

Several processes are described in the literature in which finely-divided dry or damp powders are tumbled in rotating containers to form small spheres by accretion. This general type of process is called "balling" or "pelletizing".

Meissner et al, *Rate of Pelletization of Zinc Oxide Powders,* I&EC Process Design & Rev., 5 (1) 10-14 (1966) described a dry binderless process for producing zinc oxide pellets from submicron powder. Seeds consisting of precompacted granules of zinc oxide about 200 mesh in size were introduced into a drum containing dried submicron zinc oxide powder. As the sealed drum rotated at a constant speed of 33 to 110 rpm, the seeds grew by accretion to form spheres.

Kapur and Fuerstenau, *Size Distribution and Kinetic Relationships in the Nuclei Region of Wet Pelletization,* I&EC Process Design & Rev., 5(1) 5-10 (1966), produced balls by tumbling damp limestone powder in a rotating drum. In this process 40 to 50 volume % water was blended with the limestone, and then the damp batch was passed through a screen to produce fine granules. The granules were then tumbled in a drum containing lifter bars around the inner periphery of the drum. As the drum rotated the mass was transformed into small spherical agglomerates, the size increasing as the number of drum rotations increased. Spheres up to 5 mm in diameter were produced.

Williams, *Fabrication of Spheres of Controlled Size from Powder Materials by a Planetary Rolling Technique,* Proc. Brit. Ceram. Soc. No. 12, March, 1969, described a somewhat similar process for producing ceramic spheres. In this process, small seed spheres grew by accretion in a planetary mill as powder/binder batch was systematically added. The rate of accretion was controlled by adjusting the concentration of n-decanol binder in the powder feed. Three successive levels of binder were necessary for the controlled build-up technique:

1. A high content, for forming seed spheres
2. A medium content, for continuous addition
3. A low content, for producing smooth spheres Capes and Sutherland, *Formation of Spheres from Finely Divided Solids in Liquid Suspension,* I&EC Process Design & Development, 6(1) 146-54 (1967), developed a process based upon the formation of spheres from powder in liquid suspension. The dispersed powder was caused to agglomerate into spheres by agitating the suspension with a small amount of a second liquid which preferentially wetted the solid and was immiscible with the first liquid. During the agitation the powder became coated with the second liquid and it agglomerated to form spheres. In their work, the first liquid was carbon tetrachloride, and the second liquid was either water, methanol, or mixtures of the two. A typical batch was:

Sand: 10 gm
Carbon Tetrachloride: 75 cc
Water: 2 cc

Additional gelation-based processes for producing ceramic balls have been reported. Haas et al, *Chemical Flowsleet Conditions for Preparing Urania Spheres by Internal Gelation,* I&EC Product Res. Dev. 19(3) 459-67 (1980) produced $UO_2$ balls by chemical gelation of uranyl nitrate solution droplets. Decomposition of hexamethylenetetramine (HMTA) dissolved in the uranyl nitrate solution releases ammonia which causes precipitation of hydrated $UO_3$ gel. In this process droplets of the solution settled in a warmed trichloroethylene bath which caused decomposition of the HMTA. After washing with 0.5M sodium hydroxide solution the spheres were dried and fired.

Hardwick et al (U.S. Pat. No. 4,182,627) produced cobalt bonded tungsten carbide pen balls by a gel-based process. In this process droplets were formed of a mixture consisting of tungsten carbide particles, guar gum, a soluble cobalt salt such as cobalt nitrate, and a wetting agent. The droplets gelled when placed in contact with an 8N aqueous solution of sodium hydroxide. After washing with water the spheres were dried in air at ambient temperature and fired.

Dry pressing of small right cylinders can be carried out using a spray dried granulated powder containing 2 to 4 weight percent Carbowax 20M pressed at 5000 to 20,000 psi.

Extrusion of rods of small cross-section can be carried out with a powdered batch containing 2 to 5 weight percent Methocel 20M plasticized with water. Mixing would be carried out in a mix-muller prior to extrusion.

All of the processes described above can be used to produce zirconia-based pen ball blanks using the current batch composition ground to particle size distributions shown in Table 2 under the heading new Pen Balls.

EXAMPLE 2

An example will now be offered of another process for forming the pen balls of this invention, this alternative process not involving the hot isostatic pressing technique which has been previously described as involved in the production of the pen balls of this invention. This example employs the smaller average particle size zirconium oxide containing batch which was mentioned in connection with Table 2. This example describes the fabrication and properties of stabilized zirconia ceramics containing 3.5 weight percent MgO suitable for forming ball point pen balls.

A suspension was prepared as follows: 4540 cc water and 125 cc Nopcosperse 44 (sodium polyacrylate anionic polyelectrolyte in aqueous solution) were stirred together with 10,950 grams of zirconia (Zircoa A-Grain) and 568 grams of magnesium hydroxide. The mixture was placed in a vibratory mill charged with stabilized zirconia grinding media and ground for a period of 72 hours, producing a slip with an average particle size of 0.60 microns. Curve C of both FIGS. 2 and 3 illustrates the zirconium oxide containing batch particle size distribution of this example. Curve B of FIGS. 2 and 3 shows another particle size distribution, the average batch particle size being somewhat under one micron. Curve B may be considered as representing the upper average particle size for a batch which will yield the low porosity pen balls without hot isostatic pressing. (The reader will here note that this average particle size is less than one-half that of typical prior art average particle size for the production of dispersion media/abrading balls.) A solution of 85 grams of Superloid (ammonium alginate) in 5675 cc water was prepared and blended thoroughly with the milled batch.

The slip was passed through a 325-mesh screen and deaired by drawing a vacuum over the slip in a closed container. Subsequently, as shown at FIG. 1, the suspension was fed from container 12 by means of air pressure 14 through duct 22 and thence through a plurality of nozzles 24 composed of 22 gauge stainless steel tubes to form droplets for gelling.

Gelling took place as the droplets 26 from nozzles 24 (see FIG. 1) were allowed to fall into bath 28 consisting of a solution of $CaCl_2$ in water having a specific gravity of 1.07 $gm/cm^3$. The droplets 26 remained in the solution for an additional 15 minutes following dropping in order to allow them to harden sufficiently to avoid distortion during further processing. The droplets were then thoroughly washed in flowing water and placed in an electric dryer at 100 degrees C. where they were held overnight.

The dried droplets were placed in stabilized zirconia crucibles and fired in a gas-fired tunnel kiln to 1675 degrees on the schedule listed earlier.

After firing it was found that the pen balls had sintered to form ceramics composed of cubic zirconia with a small amount of finely divided tetragonal zirconia precipitates within the cubic grains. The apparent specific gravity of the balls was 5.68 $gm/cm^3$ as determined with a mercury porosimeter, and their mean diameter was 1.40 mm with a standard deviation of 5.2%. The crushing strength was determined by placing a pen ball between two cemented tungsten carbide plates and applying compressive force with an Instron mechanical testing machine with a cross-head speed of 0.2 mm per minute until the crushing strength was exceeded. The carbide plates contained 6 percent cobalt, had a hardness of 90 Rc (Rockwell Hardness Number), and were finished to 2 micro inches. The mean crushing strength of 10 balls was found to be 94.4 pounds, with a standard deviation of 11.2 percent.

Image analysis of polished ball sections gave a mean pen ball porosity of 1.01% volume percent with a standard deviation of 25.8 percent. The mean pore size was 2.73 microns, with a standard deviation of 4.0%, and the major mode pore diameter was 2.25 microns.

One lot of these pen ball blanks was finished to produce pen balls with surface roughness in the range 4 to 6 micro inches for use in rolling-ball pens. Another lot was finished to a surface roughness of 1½ to 2 micro inches for use in viscous ink ball point pens.

Figure 4:
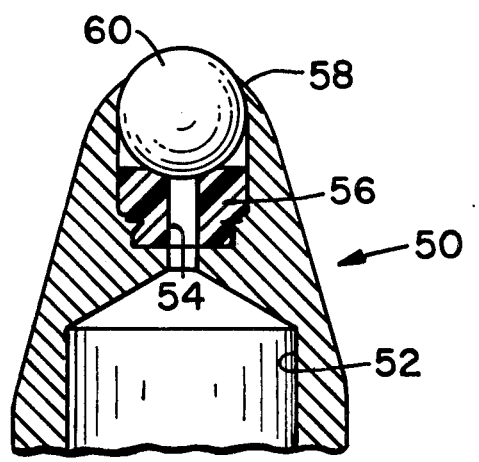
FIG. 4 is a cross-sectional view of the tip of a typical ball point writing pen, showing the pen ball of this invention in a typical ball point writing pen.

Referring now to FIG. 4, a typical ball point writing pen employing the pen ball of this invention is shown, the Figure illustrating the tip only. The numeral 50 denotes generally the tip, often formed of stainless steel. A bore 52 receives a core the latter adapted to be connected to the writing pen ink reservoir. An ink flow groove 54 is formed in the tip 50 and in typical plastics seat 56. The end of tip 50 is peened over at 58, to hold the pen ball 60 rotatably in the shown socket.

This invention thus relates to a ceramic body composed of a fully or partially stabilized zirconium oxide, formed by any of various means into a spherical ball, for use in metering or transferring ink from a reservoir in a pen to a writing surface, such as paper.

The composition of liquid transfer balls of this invention can be represented by the general molar formula:

$$(ZrO_2)_{1-x}(R_yO_z)_x$$

where R represents at least one element from the group consisting of the elements which form cations with stable +2, +3, and +4 valences in the oxides, x represents a number having a value of from about 0.05 to about 0.3, and y and z represent numbers having values sufficient to make $R_yO_z$ electrically neutral. Examples of elements which are suitable for the element R are magnesium, calcium, yttrium, scandium and lanthanide elements such as cerium, neodymium, samarium, and ytterbium which form the oxides, MgO, CaO, $Y_2O_3$, $Sc_2O_3$, $CeO_2$, $Nd_2O_3$, $Sm_2O_3$, and $Yb_2O_3$, respectively. The first two oxides being of elements of Group II-A, the remaining oxides being of Group III-B, including the lanthanide series of the Periodic Table as shown on page B-4 of the Handbook of Chemistry and Physics, 50th Edition and published by CRC Press, Inc. of Cleveland, Ohio. It is to be observed that mixtures of the designated oxides are suitable, such as a mixture of MgO and $Y_2O_3$. The quantity x retains the same range of values.

By the practice of this invention, a zirconium oxide body with closely controlled physical and chemical properties is made to exhibit the optimum combination of all the properties required for superior performance as the ball of a ball point pen. This optimization of properties enables zirconium oxide bodies to outperform any other material for such use. For example, tungsten carbide balls in ball point pens, designed to meter 0.19 gram of ink per hour will cause socket wear and increase metering rate until the ink reservoir is exhausted in 5-6 hours. The ZrO$_2$ ball of this invention will begin metering at 0.19 gram/hour and finish at 0.22 gram/hour, with the same 13-16 hour total ink supply. Tungsten carbide balls and other metal balls in contact with water based inks will exhibit initial corrosion defects after five minutes in 5% HNO$_3$ solution. Tests in acetic acid solutions show that tungsten carbide balls show severe corrosion effects within fifteen minutes to twenty-four hours of contact with the acid. ZrO$_2$ is totally inert to the effects of acetic acid. Further, austenitic stainless steels are relatively soft and do not have the water resistance to prevent wear effects from contact with surfaces such as papers. ZrO$_2$ with hardnesses in the range from 75-95 R$_c$ will not be affected by contact with most surfaces.

The low (less than 8%) porosity zirconium oxide pen balls of this invention may be fashioned from a prior art slip particle size distribution by hot isostatically pressing the prior art dispersion media formed of zirconium oxide and stabilizer, such a typical prior art distribution shown at Curve A of FIGS. 2 and 3. Alternatively, a slip may be formulated having a zirconium oxide particle size distribution such as shown at Curve C of FIGS. 2 and 3, and then employing the same prior art sol-gel process for ball formation, but without the necessity of hot isostatic pressing, to thereby achieve a ball porosity less than about 8%.

What is claimed is:

1. A liquid transfer device including a hollow tip, adapted to be placed in communication with a liquid container, and a liquid transfer ball seated in said hollow tip in protruding relation, said liquid transfer ball formed of a ceramic comprising zirconium oxide as the major analytic constituent of the ceramic and being at least partially stabilized by a stabilizer, and said ball having a porosity of less than about 8 percent by volume as determined by optical image analysis of a polished section.

2. The liquid transfer device of claim 1 wherein the zirconium oxide is at least partially stabilized by a stabilizer which produces at least one phase selected from cubic and tetragonal zirconia at elevated temperatures and which phase tends to be retained upon cooling to room temperature.

3. The liquid transfer device of claim 2 wherein the composition of the ball is represented by the molar formula $$(ZrO_2)_{1-x}(R_yO_z)_x$$

where R represents at least one element from the group consisting of elements of Group II-A, Group III-B, and the lanthanide series of the Periodic Table which form cations with stable +2, +3, and +4 valences in the oxide, x represents a number having a value from about 0.05 to about 0.3 and y and z represent numbers having values necessary to make (R$_y$O$_z$) electrically neutral.

4. The liquid transfer device of claim 3 wherein the stabilizer is selected from the group consisting of CaO, MgO, Y$_2$O$_3$ and mixtures thereof.

5. The liquid transfer device of claim 4 wherein the stabilizer is an oxide selected from the group consisting of CaO, MgO, and Y$_2$O$_3$ and where the amount of each said oxide, based upon the total weight of the ball is: 2.6 to 5.5% MgO, 3.0 to 10% CaO, and 4.0 to 16% Y$_2$O$_3$.

6. The liquid transfer device of claim 2 formed of zirconium oxide powder having an average particle size not greater than about one micron.

7. The liquid transfer device of claim 2 formed of zirconium oxide powder having an average particle size not greater than about 0.6 micron.

8. The liquid transfer device of claim 2 which is produced by first forming a sintered mass of at least partially stabilized zirconium oxide, said sintered mass exhibiting porosity, as determined by optical image analysis of a polished section, and then hot isostatically pressing the mass to reduce its porosity.

9. The liquid transfer device of claim 8 wherein the sintered mass is formed of particles whose average particle size is greater than one micron and exhibits a porosity of at least about 10 percent prior to hot isostatic pressing.

* * * * *